US012194653B2

(12) United States Patent
Liliegård et al.

(10) Patent No.: US 12,194,653 B2
(45) Date of Patent: Jan. 14, 2025

(54) METHODS FOR PRODUCTION OF A GUIDE BAR FOR A CHAINSAW AND A GUIDE BAR FOR A CHAINSAW

(71) Applicant: HUSQVARNA AB, Huskvarna (SE)

(72) Inventors: Christian Liliegård, Jönköping (SE); Jörgen Johansson, Jönköping (SE)

(73) Assignee: HUSQVARNA AB, Huskvarna (SE)

( * ) Notice: Subject to any disclaimer, the term of this patent is extended or adjusted under 35 U.S.C. 154(b) by 370 days.

(21) Appl. No.: 17/616,832

(22) PCT Filed: Sep. 16, 2020

(86) PCT No.: PCT/SE2020/050862
§ 371 (c)(1),
(2) Date: Dec. 6, 2021

(87) PCT Pub. No.: WO2021/061037
PCT Pub. Date: Apr. 1, 2021

(65) Prior Publication Data
US 2022/0305691 A1 Sep. 29, 2022

(30) Foreign Application Priority Data
Sep. 24, 2019 (SE) .................................... 1951075-9

(51) Int. Cl.
*B27B 17/02* (2006.01)
(52) U.S. Cl.
CPC .................................. *B27B 17/025* (2013.01)
(58) Field of Classification Search
CPC ... B27B 17/025; B27B 17/02; B27B 17/0008; B23D 65/00; B23K 2103/04; Y10T 29/49799
(Continued)

(56) References Cited

U.S. PATENT DOCUMENTS 3,185,191 A * 5/1965 Olsen ..................... B27B 17/12
30/387
3,416,578 A * 12/1968 Irgens ................... B27B 17/025
30/387
(Continued)

FOREIGN PATENT DOCUMENTS

CN 201380333 Y 1/2010
CN 104368875 A 2/2015
(Continued)

OTHER PUBLICATIONS

International Search Report and Written Opinion in International patent application No. PCT/SE2020/050862, dated Dec. 1, 2020.
(Continued)

*Primary Examiner* — Ghassem Alie
(74) *Attorney, Agent, or Firm* — Burr & Forman LLP

(57) ABSTRACT

The present disclosure relates to a method (100) for production of a chainsaw guide bar (5). The method comprises the steps of providing (120) an elongated core plate (5) extending along a plane, and, in said plane has a length (Lc) in the longitudinal direction (D), and a width (Wc) perpendicular to the longitudinal direction (D), comprising a pair of opposite long side edges (33) and at least one detachable element (31) that extends along at least one of the long side edges of the core plate. Arranging (140) a side plate (23a, 23b) on each side of the core plate (25), thereby forming a sandwiched structure and joining (160) of the plates (23a, 23b, 25) for formation of an elongated guide bar (5), wherein the at least one detachable element (31) remains attached to the core plate (25). The disclosure also relates to a guide bar (5) for a chainsaw (1). The guide bar (5) comprises a laminated structure of at least three layers comprising a first side plate (23a), a second side plate (23b), and a core plate (25) disposed between said first side plate (23a) and said second side plate (23b), wherein the core plate (25) is
(Continued)

provided with at least one detachable element (31). The disclosure also relates to an alternative method (200) of production of a chainsaw guide bar (5).

19 Claims, 7 Drawing Sheets

(58) Field of Classification Search
USPC .... 30/387, 383, 381, 384; 83/820, 821, 824; 76/112; 29/418, 463
See application file for complete search history.

(56) References Cited

U.S. PATENT DOCUMENTS

| | | | |
|---|---|---|---|
| 3,949,475 A | 4/1976 | Tokarz | |
| 4,486,953 A | 12/1984 | Halverson | |
| 4,885,843 A | 12/1989 | Kelsay, III et al. | |
| 4,965,934 A | 10/1990 | Eriksson et al. | |
| 5,067,243 A | 11/1991 | O'Neel | |
| 5,271,157 A * | 12/1993 | Wieninger | B27B 17/025 30/387 |
| 5,666,733 A | 9/1997 | Nitschmann | |
| 5,842,279 A * | 12/1998 | Andress | B27B 17/025 30/387 |
| 6,138,339 A * | 10/2000 | Escher | B27B 17/025 29/418 |
| 10,040,214 B2 * | 8/2018 | Baratta | B27B 17/025 |
| 2011/0192039 A1 * | 8/2011 | Fuchs | B27B 17/025 30/383 |
| 2019/0118404 A1 * | 4/2019 | Sarius | B27B 17/025 |

FOREIGN PATENT DOCUMENTS

| | | | | |
|---|---|---|---|---|
| CN | 104416227 A | 3/2015 | | |
| DE | 19815289 C1 | 4/1999 | | |
| DE | 102010007081 A1 | 8/2011 | | |
| EP | 2459354 B1 | 9/2018 | | |
| EP | 3769923 A1 * | 1/2021 | ............ | B23D 57/02 |
| FR | 2673880 A1 | 9/1992 | | |
| JP | S61100264 A | 5/1986 | | |
| JP | S62251101 A | 10/1987 | | |
| JP | S636801 U | 1/1988 | | |
| JP | H01297201 A | 11/1989 | | |
| JP | H11320501 A | 11/1999 | | |
| JP | 2007-062204 A | 3/2007 | | |
| JP | 2014004765 A | 1/2014 | | |
| SE | 8802990 | 8/1988 | | |
| SE | 8804355 | 12/1988 | | |
| WO | WO-9720957 A1 * | 6/1997 | ............ | B27B 17/02 |
| WO | 97/27980 A1 | 8/1997 | | |
| WO | 2011014396 A1 | 2/2011 | | |
| WO | 2017174633 A1 | 10/2017 | | |

OTHER PUBLICATIONS

Swedish Search Report in Swedish patent application No. 1951075-9, dated Mar. 11, 2020.

* cited by examiner

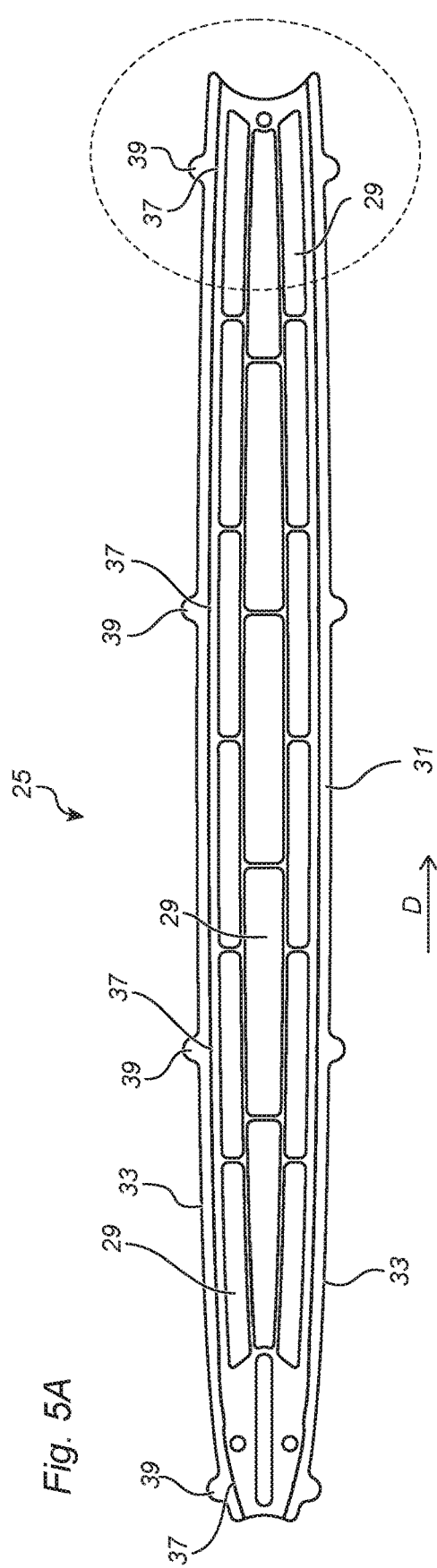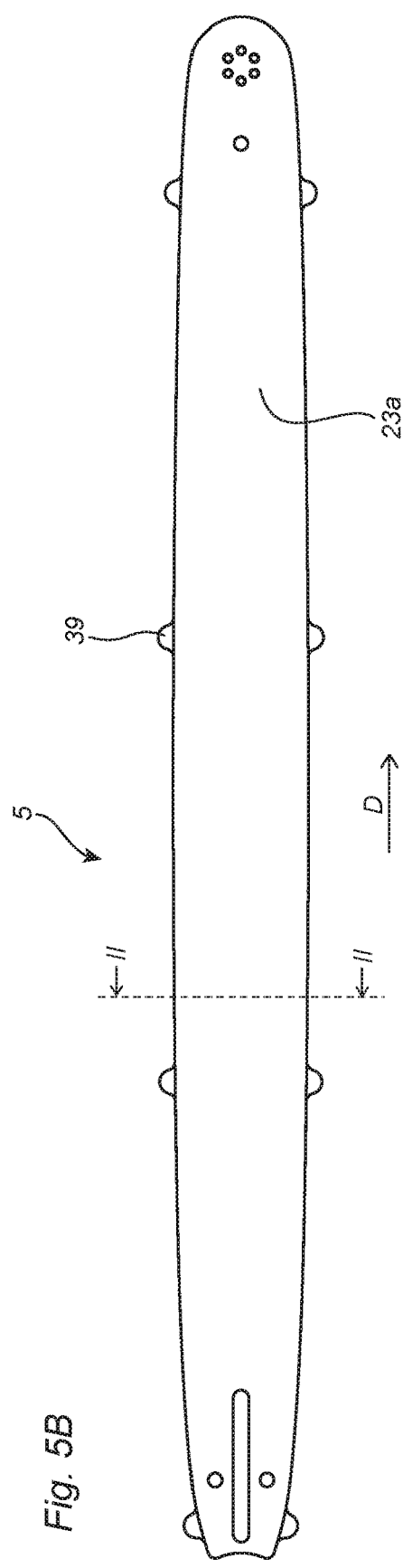
Fig. 5A
Fig. 5B

METHODS FOR PRODUCTION OF A GUIDE BAR FOR A CHAINSAW AND A GUIDE BAR FOR A CHAINSAW

FIELD OF THE INVENTION

The present invention relates a to the field of chainsaws, especially to a guide bar, and methods for production of a guide bar.

BACKGROUND

Chainsaws are commonly used in both private and commercial contexts to cut timber or perform other rigorous cutting operations. They can be powered by gasoline engines or electric motors (e.g., via batteries or wired connections) to turn a chain around a guide bar at relatively high speed. The chain includes cutting teeth that engage with lumber or other material to cut the material as the teeth pass over a surface of the material at high speed.

Guide bars normally have a laminate structure, including an inner layer or plate member which is sandwiched between a pair of outer layers or plate members. The inner layer typically has a smaller length and width than the outer layers, which are otherwise substantially identically shaped, so that a guide groove around the entire periphery of the guide bar is defined between the outer layers. When the guide bar is used in a chainsaw, guide teeth of the saw chain slide within this groove.

EP 1 448 344 describes an exemplary laminated guide bar to be used in a chainsaw. There is however always a need for further improvements of a laminated guide bar and the method of production of a laminated guide bar to cope with tough operating conditions of a chainsaw and to improve the performance of the chainsaw.

SUMMARY

It is an object of the present invention to solve, or at least mitigate, parts or all of the above mentioned problem. To this end, there is provided a method for production of a chainsaw guide bar. The method comprises providing an elongated core plate extending along a plane, and in said plane having a length in the longitudinal direction and a width perpendicular to the longitudinal direction, the core plate comprising a pair of opposite long side edges and at least one detachable element that extends along a portion of at least one of the long side edges. The method may further comprise arranging a side plate on each side of the core plate thereby forming a sandwiched structure, and joining the plates for formation of an elongated guide bar, wherein the at least one detachable element remains attached to the core plate.

The three plates may be attached to each other by welding, normally spot welding or pressure welding, brazing, adhesives, mechanical fasteners, such as rivets or bolts, or other well-known means of attachment.

By providing the core plate with at least one detachable element is it possible to handle the guide bar substrate without mechanically handling the actual core plate and thereby affecting any of the parts that will be included in the final product. Instead, the core plate may be handled via the detachable elements.

The detachable element can act as a detachable spacer which supports the inward-facing sidewalls of the side plates and thereby maintains a well-defined distance between side plates during the joining process. If the plates (side plates and core plate) are made of metal, such as for example steel, distortions between the plates may occur if heat is provided to the plates during the joining process. By providing the core plate with at least one detachable element distortions between the plates may be reduced, resulting in an elongated guide bar, with two side plates, that are dimensionally identical to each other, that lie in parallel planes alongside each other, with the core plate and the at least one detachable element therebetween. According to the embodiment, the core plate has the same thickness, in a direction perpendicular to the plane of the core plate, as the detachable element.

In one embodiment, the method may further comprise hardening and tempering of the guide bar, while the at least one detachable element remains attached to the core plate. After the plates have been joined together, they may further be exposed for hardening and tempering. Hardening is used to impart specific mechanical properties to the guide bar to increase durability, especially where the chain runs. Tempering is low temperature heat treatment (150-650° C.) designed to remove stress and brittleness caused by cooling and develop the desired mechanical properties. By providing the core plate with at least one detachable element that remains attached to the core plate during these heating processes, distortions between the plates may be further reduced.

In one embodiment, the method may further comprise removal of the at least one detachable element to form at least a portion of a guide groove along an edge of the guide bar. The at least one detachable element may act as a spacer between the core plate and the side plates during the joining process and/or the hardening and tempering processes, thereby preventing distortions between the plates. After the guide bar has been formed, the detachable element no longer fills any function and may be removed from the guide bar.

A portion of a guide groove may be formed along an edge of the guide bar when the at least one detachable element has been removed. Dependent on the size of the at least one detachable element or the number of detachable element, a guide groove may be formed along the entire outer periphery of the guide bar. Different types of chain saws require different grooves so the depth and the width of the groove are selected to meet the requirements.

In one embodiment, providing the core plate may comprise cutting a sheet of metal to form an elongated core plate, the length and width of which are smaller than a corresponding length and width of the side plates. The elongated guide bar may have a rear end rigidly mounted to a saw housing or to the engine of the chainsaw and a front end remote from the saw housing. The front end may comprise a sprocket which receives the saw chain and guides the chain around the front end of the guide bar. Each of the plates, i.e. the core plate and the side plates, have a length from the rear end to the front end of the guide bar. The side plates have the same size, while the core plate has a slightly smaller width and length than the side plates, creating a groove around the periphery of the guide bar. The saw chain may be driven within this groove around the guide bar with help of drive links in the saw chain. To reduce stress of the saw chain, it is preferred that the drive links fit precisely and travel straight within the guide groove. If the width is too big, the saw chain may move sideways and if it is to small, the saw chain may get caught in the guide groove, this has a negative impact on the function and durability of the saw chain and guide bar.

In one embodiment, providing the core plate may further comprise integrally forming the core plate with the at least one detachable element. By doing this from a single piece of material, much time and material may be earned that may reduce the production cost for the guide bar.

In one embodiment, providing the core plate may further comprise cutting or punching of the core plate to create a gap between the core plate and the at least one detachable element, the gap extending along a portion of at least one of the long side edges of the core plate, with exception for at least one connection configured as a frangible bridge. By creating a gap along at least one of the long side edges of the core plate with at least one connection, the core plate and detachable element may easily be formed in one piece, and will allow for simple detachment from each other. After the guide bar has been formed, the detachable element can easily be removed from the core plate due to the thin, frangible bridge.

In one embodiment, providing the core plate may further comprise providing the at least one frangible bridge with a thickness of at least 0.5 mm, preferably between 0.5-0.8 mm, perpendicular to the plane of the guide bar.

In one embodiment, providing the core plate can further comprise providing the at least one frangible bridge with a length of at least 1 mm, preferably between 1-3 mm, along an outer edge of the guide bar. The frangible bridge may be designed so that the detachable element can be handled during the production step(s) without detaching unintentionally but it must still be possible to detach the element from the core plate in an efficient manner after the guide bar has been formed. It has shown that a thickness of at least 0.5 mm and a length of at least 1 mm proves a cross sectional area of the frangible bridge that can withstand a load of 1000N and this is enough to handle the load during production and also possible to quite easily break the bridge after the guide bar has been formed.

In one embodiment, providing the core plate may comprise providing the core plate with a plurality of frangible bridges. The number of frangible bridges may depend on the length of the elongated guide bar. The chainsaw may be employed to cut media of various sizes, wherein the length of the guide bar can be different for different applications. In most situations, the guide bar is relatively long, and may be substantially longer than the main body of the chainsaw. The frangible bridges may be evenly distributed along the entire length of the guide bar.

In one embodiment, providing the core plate may further comprise providing the at least one detachable element with at least one gripping element, integrally formed with the detachable element. For easier removal of the detachable element from the core plate, the detachable element may be provided with at least one gripping element. The gripping element may be integrally formed with the detachable element at one of the long side edges, and thus production cost may be reduced. After forming of the guide bar, only the gripping element extends out of the guide groove, while the long side edges of the detachable element are arranged edge to edge with the long sides edges of the side plates.

The gripping element can, for example, be a hole or a hook. The shape may be elongated and formed as a rectangle or an oval. The shape should be easy to grasp with the fingers.

In one embodiment, providing the core plate may comprise providing the at least one detachable element with one gripping element for each frangible bridge. The gripping element may be arranged at the frangible bridge so that a straight line is passing through the gripping element and the frangible bridge, is perpendicular to a longitudinal axis of symmetry of the guide bar. Thereby, it will be easier to provide the force required to break the frangible bridge and thereby remove the detachable element from the core plate after formation of the guide bar.

In one embodiment, removal of the at least one detachable element from the core plate may comprise gripping of the gripping elements for removal of the at least one detachable element from the core plate and pulling along the plane of the guide bar in a direction transversal to the longitudinal direction. As this may allow removal of the detachable element from the core plate automatically, the production cost may be further reduced. The gripping element may also be provided with a centrally located passage, in form of a through hole. A rod may be automatically introduced into this hole for providing the force to break the frangible bridge.

In one embodiment, providing the core plate may comprise providing the core plate with at least one cutout hole, said at least one cutout hole may be covered by the side plates so that a closed space is formed within the guide bar. The weight of the guide bar is an important parameter in order to facilitate for and increase the efficiency of the work for the operator of the chainsaw. By providing the core plate with at least one cutout hole, the weight of the guide bar is reduced. The cutout hole may be closed/covered by the side plates to maintain the stiffness of the guide bar.

Depending on the desired degree of weight reduction and degree of accepted or justifiable reduction of stiffness, several cutout holes may be provided, which may optionally be evenly distributed over the core plate. By way of example, about 50-90% of the area of the core plate may be provided with cutout holes. The shape and the size for each of the cutout hole may vary.

According to a second aspect, parts or all of the above mentioned problems are solved, or at least mitigated, by a guide bar for a chainsaw. The guide bar comprises: a laminated structure of at least three layers comprising a first side plate, a second side plate, and a core plate disposed between said first side plate and said second side plate, wherein the core plate is provided with at least one detachable element. The at least one detachable element may be integrally formed with the core plate. A portion of a guide groove may be formed when the at least one detachable element is removed from the core plate.

By providing the core plate with support elements during the joining process of the plates and/or the following heat treatments, the width of guide groove around the periphery of the guide bar will be maintained in the formed guide bar. It is important that the width of the guide groove is homogenous around the guide bar to reduce the stress on the saw chain. The support elements will only be present during the manufacturing process ensuring correct width of the guide groove. The support elements are connected to the core plate with thin bridges on several locations along the long side edges of the core plate. The bridges are designed so that the support elements can be handled during the manufacturing process without detaching unintentionally but are able to be detached from the core plate after the last production step.

According to a third aspect, part of or all of the above mentioned problems are solved of at least mitigated by a method for production of a chainsaw guide bar. The method comprises arranging a side plate on each side of a core plate, thereby forming a sandwiched structure with a guide groove between the side plates, arranging a spacer within the guide groove, joining the core and the side plates to form an elongated guide bar. Subsequent method steps may comprise hardening and tempering of the guide bar, and removing the spacer from the guide groove. The spacer may be manually fitted within the guide groove prior to the joining and hardening and tempering processes, and manually removed after the guide bar has been formed. The spacer supports the inward-facing sidewalls of the side plates and thereby maintains the well-defined guide groove between side plates during the joining process. This method may involve comparably more manual labor than an automatic process and can increase the production cost, but may nevertheless result in increased accuracy in the manufacturing of guide bars.

It is noted that embodiments of the invention may be embodied by all possible combinations of features recited in the claims. Further, it will be appreciated that the various embodiments described for the device are all combinable with the method as defined in accordance with the second aspect of the present invention, and vice versa.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein:

FIG. 5A illustrates a side view of the core plate according to FIG. 4 with detachable elements;

FIG. 5B illustrates a side view of a guide bar comprising the core plate in FIG. 5A;

All the figures are schematic, not necessarily to scale, and generally only show parts which are necessary to elucidate the embodiments, wherein other parts may be omitted.

DETAILED DESCRIPTION OF THE EXEMPLARY EMBODIMENTS

Figure 1:
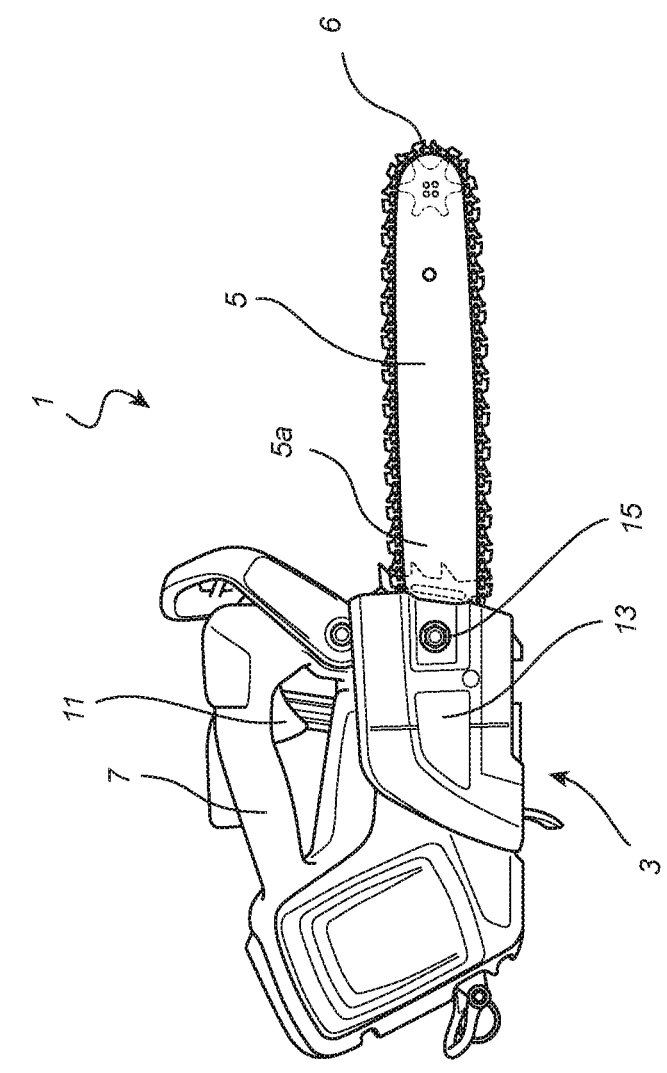
FIG. 1 illustrates a side view of a chainsaw.

FIG. 1 illustrates a side view of a chainsaw 1. As shown in FIG. 1, the chainsaw 1 comprises a housing 3 inside which a power unit or motor is housed. The power unit may be either an electrical motor or an internal combustion engine. The chainsaw 1 further comprises a guide bar 5 attached to the housing 3 along one side thereof. The guide bar 5 extends outwardly from the housing 3. An endless saw chain loop 6 may be driven around the guide bar 5 responsive to operation of the power unit to enable the chainsaw 1 to cut lumber or other materials. The chainsaw 1 may also comprise a set of handles 7, one of which is provided with a trigger 11 to facilitate the operation of the power unit when the trigger 11 is actuated. When the trigger 11 is actuated (for example, depressed), the rotating forces by the power unit can be coupled to the saw chain. A clutch cover 13 may be provided to secure a rear end 5a of the guide bar 5 to the housing 3 and cover the clutch between the parts and components that couple the power unit to the saw chain. As shown in FIG. 1, the clutch cover 13 may be attached to the housing 3 via nuts 15 that also pass through the rear portion 5a of the guide bar 5.

Figure 2:
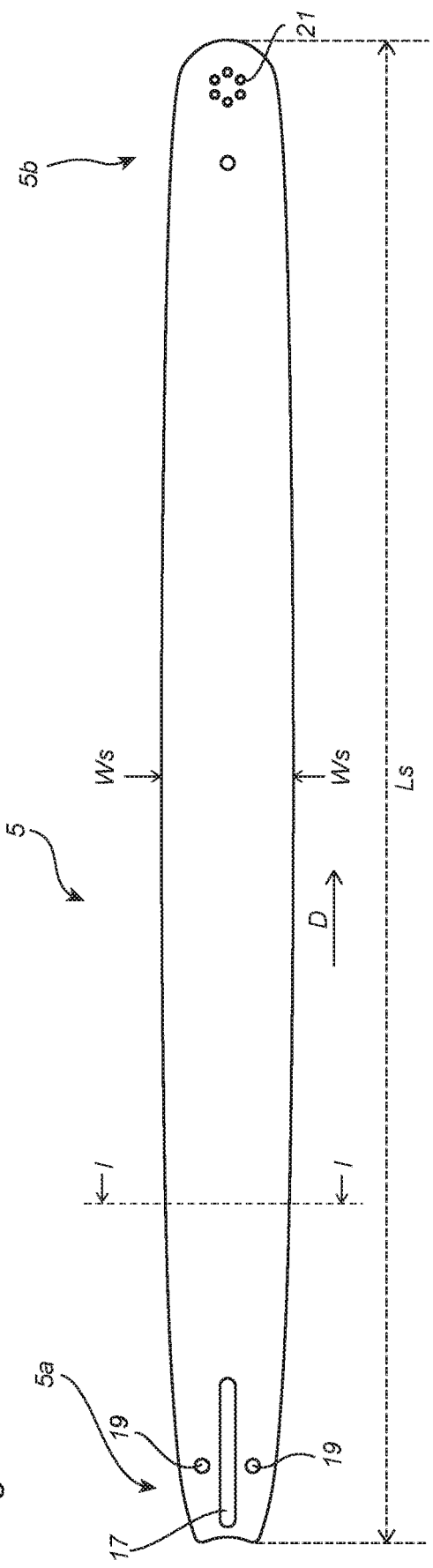
FIG. 2 illustrates a side view of a guide bar.

FIG. 2 illustrates a side view of the guide bar 5 according to FIG. 1. The guide bar 5 is elongate and has a rear end 5a mounted to housing 3 of the chainsaw 1, as seen in FIG. 1, or to the engine, and a front end 5b opposite from the rear end 5a in the longitudinal direction D of the guide bar 5. The length of the guide bar 5 may vary depending on the application. It can have a length of for example 13, 15 or 18 inches and may be substantially longer than the chainsaw 1. The front end 5b of the guide bar 5 may house a nose sprocket arrangement (not shown), which can comprise a sprocket wheel (not shown) that is rotatable to interface with the saw chain as the saw chain turns around the front end 5b of the guide bar 5. The rear end 5a of the guide bar 5 may be provided with a slot 17 and orifices 19 provided on either side of the slot 17 (above and below the slot) to fix guide bar 5 to the housing 3 via the nuts 15, as seen in FIG. 1. The guide bar 5 can be secured with tightening of the nuts 15, and a tightness of the saw chain can be adjusted on movement of the guide bar 5 and subsequent tightening of the nuts 15 when the desired chain tightness is achieved. The nose sprocket is attached to the front end 5b of the guide bar 5 via pins 21 extending perpendicular to the plane of the guide bar 5.

Figure 3:
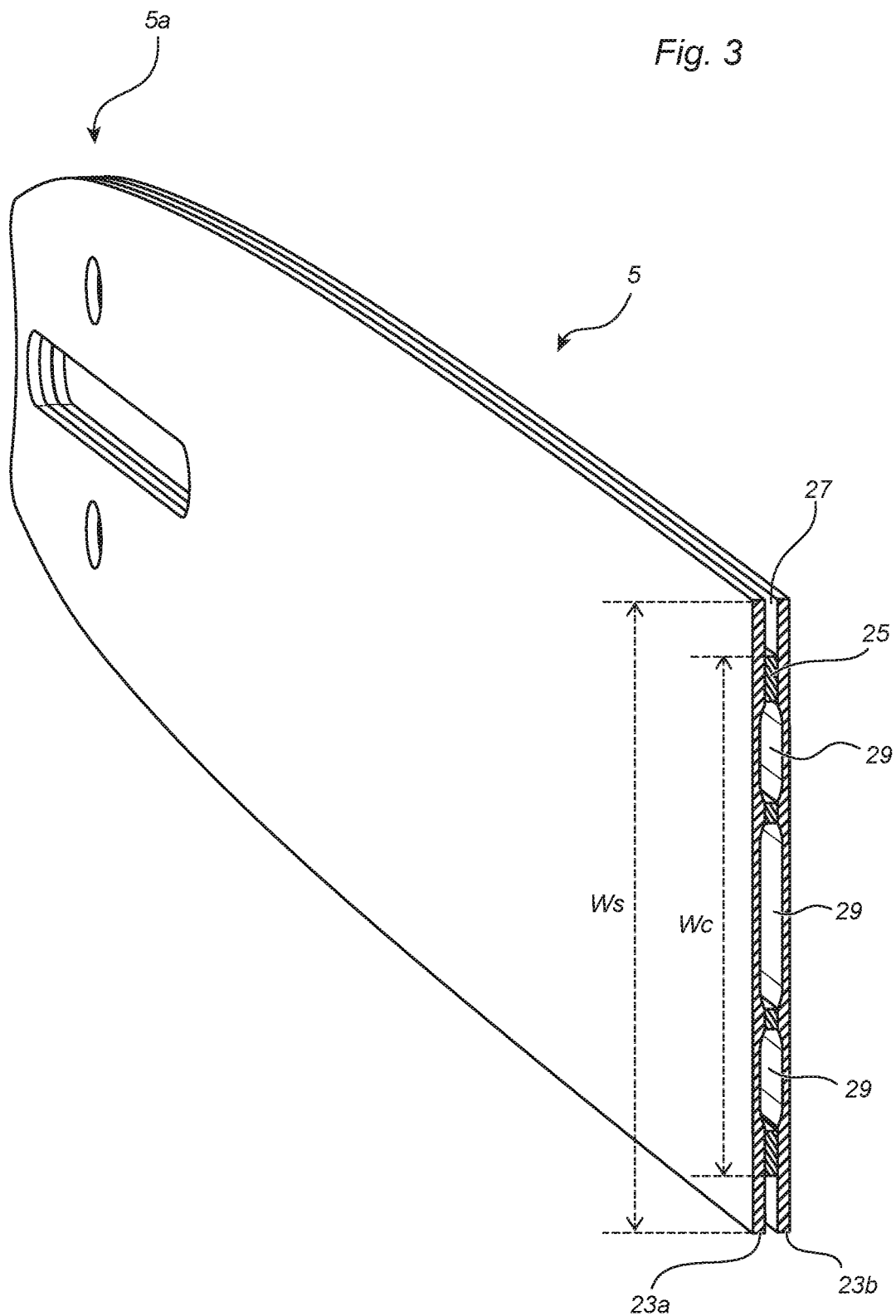
FIG. 3 illustrates a schematic view in perspective of a section of the guide bar of FIG. 2, the section being taken along a plane indicated by the line I-I in FIG. 2.

FIG. 3 illustrates a section of the guide bar of FIG. 2, the section being taken along a plane indicated by the line I-I. The guide bar 5 may be formed as a three-piece laminate, having a pair of side plates 23a, 23b and a core plate 25. The core plate 25 is illustrated with details in FIG. 4 and is elongate and extends along a plane. It has a length Lc in the longitudinal direction D and a width Wc perpendicular to the longitudinal direction D. The core plate 25 is sandwiched between the side plates 23a, 23b. The side plates 23a, 23b are normally made of the same material, which may be steel or other enough rigid and durable materials. The core plate 25 can be made of another material than the side plates 23a, 23b. The core plate 25 can have a smaller length Lc and width Wc than a corresponding length Ls and width Ws of the side plates 23a, 23b, which are identically shaped so that a guide groove 27 around the entire outer edge of the guide bar 5 is defined between the side plates 23a, 23b. Different types of saw chains require different guide grooves 27, so depth and width of the groove 27 are selected to meet the requirements of the saw chain. The width of the guide groove 27 is determined by the thickness of the core plate 25 and the depth of the guide groove 27 is determined by the difference in length Lc, Ls and width Wc, Ws between the core plate 25 and the side plates 23a, 23b.

Figure 4:
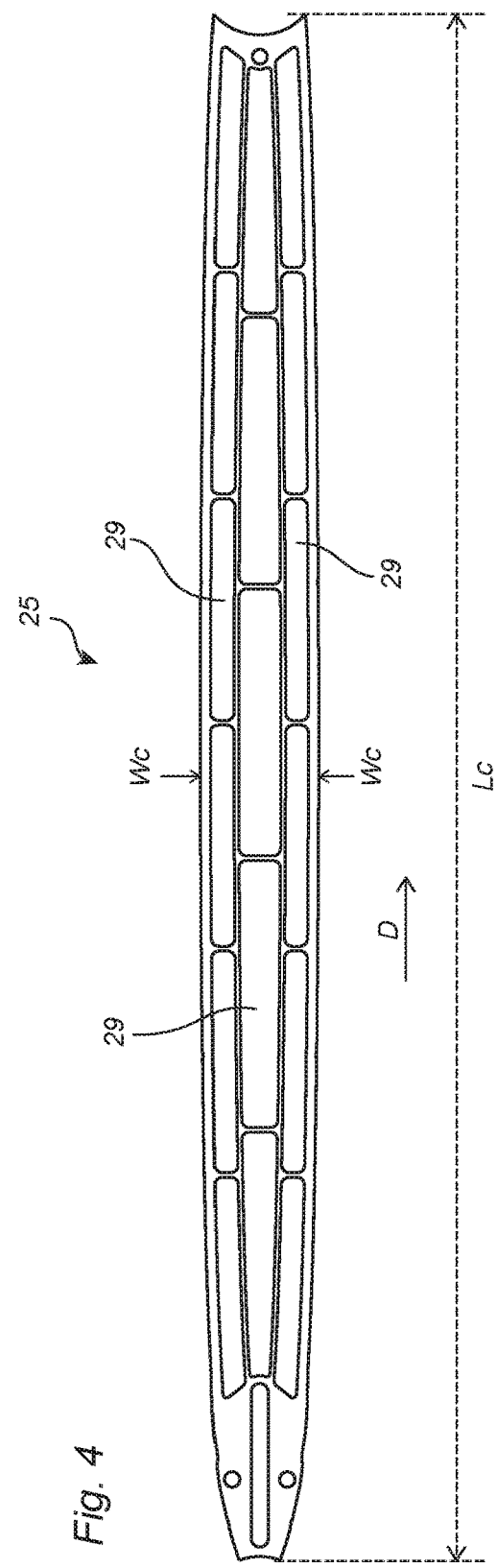
FIG. 4 illustrates a side view of a perforated core plate of the guide bar of FIG. 2.

The weight of the guide bar 5 is an important parameter to facilitate and increase the efficiency of the work for the operator of the chainsaw 1. To reduce the weight of the guide bar 5, the core plate 25 may be provides with cutout holes 29 of different shapes and sizes, as illustrated in FIG. 4. Up to 80% of the surface of the core plate 25 may be provided with cutout holes 29 with sufficient stiffness maintained for the guide bar 5. In the guide bar 5, the cutout holes 29 are covered by the side plates 23a, 23b to form a closed space.

Another alternative in order to reduce the weight of the guide bar is to use a core plate 25 of a material with low density for example aluminium or a plastic material. If the core plate 25 is made of aluminium or a plastic material to reduce the weight of the guide bar 5, the manufacturing method of the guide bar 5 may get more complicated and make the guide bar 5 more costly.

The three plates 23*a*, 23*b*, 25 can be attached to each other by welding, normally spot welding or pressure welding, brazing, adhesives and/or mechanical fasteners, such as rivets or bolts, and/or other well-known means for attachment. After the plates 23*a*, 23*b*, 25 have been joined together, they may further be exposed for hardening and tempering. Hardening processes are used to impart specific mechanical properties to the guide bar 5 to increase durability, especially where the chain runs. Tempering is low temperature heat treatment (150-650° C.) designed to remove stress and brittleness caused by cooling and develop the desired mechanical properties.

One key property of the guide bar 5 is the width of the guide groove 27, and it's desirable that the saw chain fits precisely and travels straight within the guide groove 27. Movements of the saw chain sideways in the guide groove 27 is not good for the performance of the chainsaw 1 and will increase wear on both the guide bar 5 and the saw chain. During the joining process and the following heat treatment steps, the width of the guide groove 27 may change due to distortions from heat input in the steel.

One solution to this problem is to fit a plate with the same thickness as the core plate 25 in the guide groove 27 acting as a spacer preventing the side plates 23*a*, 23*b* from collapsing inwards during the joining process and the following heat treatment steps. It is suspected that fitting the spacers within the guide groove 27 prior to the joining process and removal of the spacers after the heat treatment steps may require a lot of manual work that probably would increases the manufacturing cost of the guide bar 5.

Figure 5C:
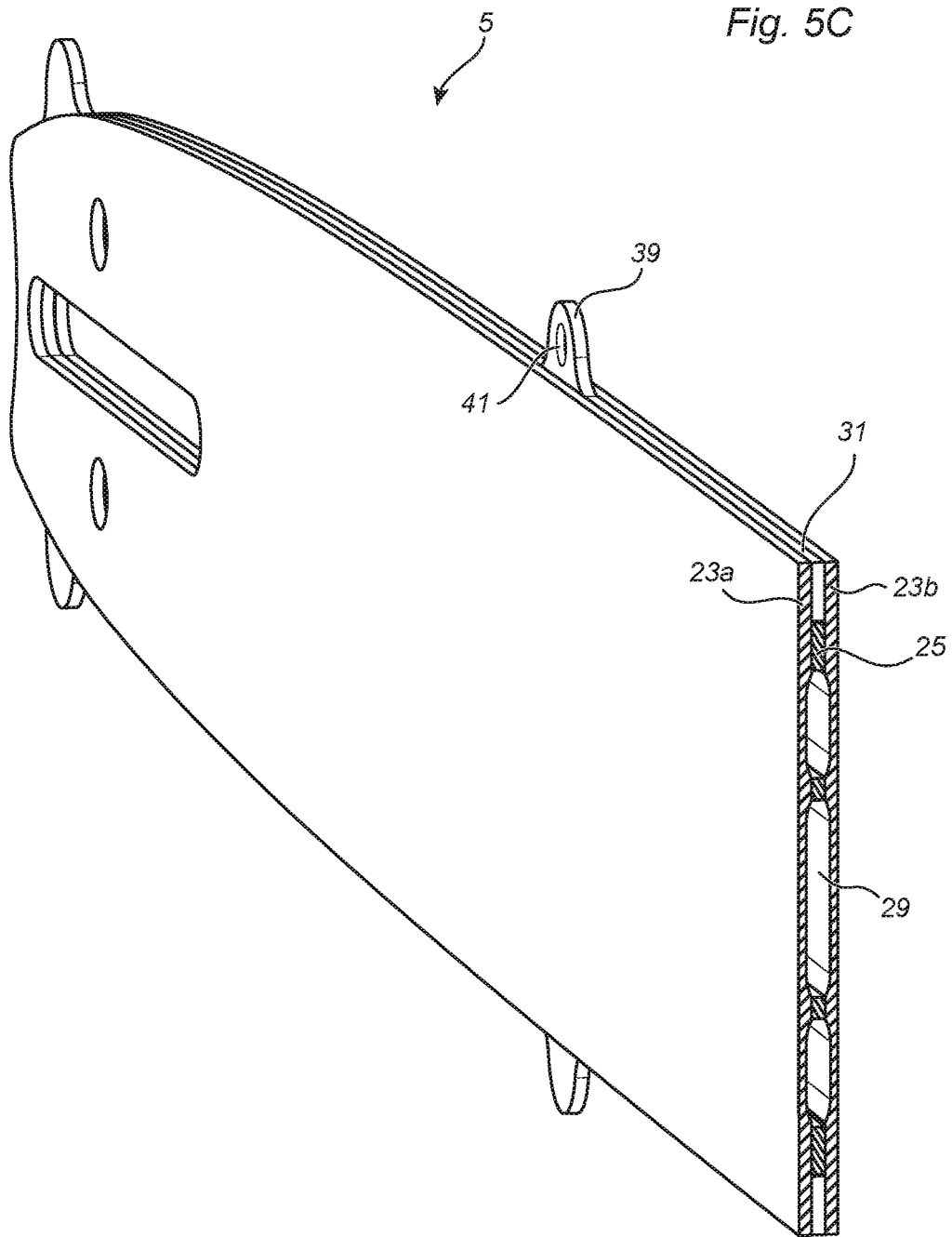
FIG. 5C illustrates a schematic view of a section of the guide bar of FIG. 5B, the section being taken along a plane indicated by the line II-II in FIG. 5B.

Another solution is illustrated in FIGS. 5A-5C where an embodiment of the guide bar 5, comprising a core plate 25 provided with a spacer in form of at least one detachable element 31 integrally formed with the core plate 25, as seen in FIG. 5A. The core plate 25 may be formed by cutting a sheet of metal to form an elongated plate with a pair of opposite long side edges 33 extending along the longitudinal direction D. The detachable element 31 may be formed by e.g. cutting, such as water cutting or laser cutting, or punching of the sheet metal to provide a gap 35 (FIG. 6), extending along at least one of the long side edges 33 of the core plate 25. Preferably two detachable elements are 31 formed by providing a gap 35 along each of the long side edges 33 of the core plate 25. The width of the gap is between 0.1-0.6 mm. Preferably, the width of the gap is between 0.2-0.4 mm and most preferred, the gap is 0.3 mm. The width of the detachable element 31 corresponds to the depth of the guide groove 27 within the guide bar 5 to be formed, wherein the long side edges of the detachable element 31 are flush with long side edges of the side plates 23*a*, 23*b*, and forms a straight outer edge of the guide bar 5, as seen in FIG. 5C. The width of the detachable element 31 may be wider than the depth of the guide groove 27 but may be easier to handle and distinguish from the core plate 25 if the width of the detachable element 31 is the same as the depth of the formed guide grove 27. The detachable element 31 can act as a detachable spacer which rests and supports the inward-facing side surfaces of the side plates 23*a*, 23*b* and thereby maintains a well-defined distance between sideplates 23*a*, 23*b* during the joining process.

Figure 6:
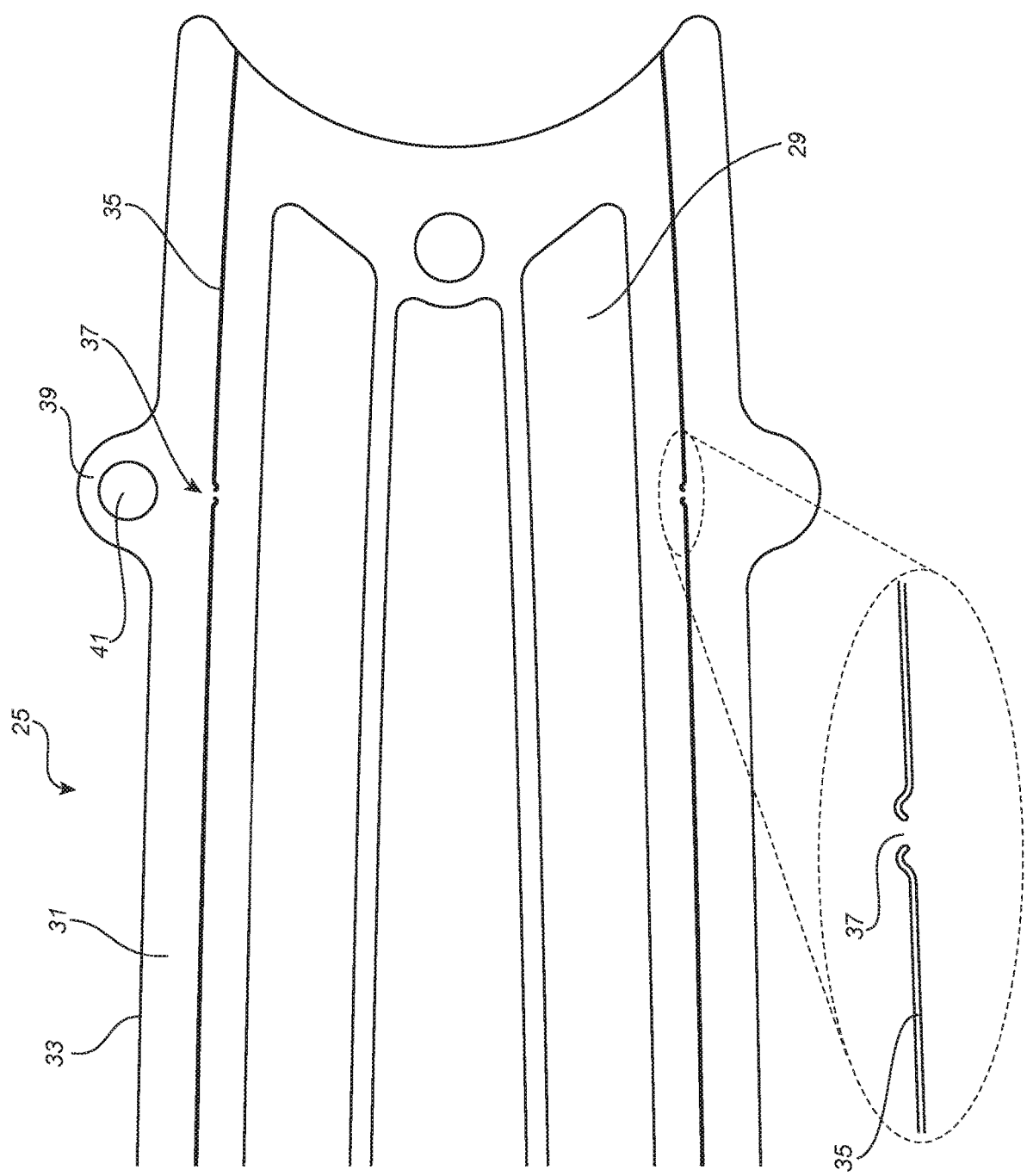
FIG. 6 is an enlarged view of section indicated with dotted lines in FIG. 5A.

To keep the detachable elements 31 attached to the core plate 25 during the manufacturing steps to form a guide bar 5, there should preferably be at least one connection between these parts 25, 31. This connection may be formed as an interruption of the gap 35 formed between the parts 25, 31, creating a frangible bridge 37, as best illustrated in FIG. 6.

The width of the frangible bridge 37 has been designed so that the detachable element 31 can be handled during the production step(s) without detaching from the core plate 25 unintentionally, but it should still be possible to detach the element 31 from the core plate 25 in an efficient manner after the guide bar 5 has been formed. It has shown that a width of at least 0.5 mm and a length of at least 1 mm provides a cross sectional area of the frangible bridge 37 that can withstand a load of 1000 N and this is enough to handle the load during production. It is also possible to quite easily break the bridge 37 after the guide bar 5 has been formed. Preferably, the width is between 0.5-0.8 mm perpendicular to the plane of the guide bar 5. The length is preferably between 1-2 mm along an outer edge of the guide bar 5.

The number of frangible bridges 37 depends on the length of the formed elongated guide bar 5. The core plate 25 according to FIG. 5A is provided with 4 frangible bridges 37 for each detachable element 31, but this is only an example. Both fewer and more frangible bridges 37 can be used depending on the application of the formed guide bar 5.

As seen in FIGS. 5A-5C and 6, the detachable element 31 can also be provided with at least one gripping element 39 to make it easier to remove the detachable element 31 from the core plate 25 after the guide bar 5 has been formed. The gripping element 39 may be integrally formed with the core plate 25 and can be formed as a protrusion at a long side edge of the detachable element 31. The gripping element 39 can, for example, be a hole or a hook. The shape may be elongated and formed as a rectangle or an oval, which makes it easy to grip with the fingers. To facilitate removing the detachable elements 31 from the core plate 25 after forming the guide bar 5, the gripping elements 39 protrude from the formed guide bar 5, as seen in FIGS. 5B och 5C. Each detachable element 31 can be provided with one gripping element 39 for each frangible bridge 37. The gripping elements 39 may be arranged opposite to the frangible bridge 37 so that a straight line passing through the gripping element 39 and the frangible bridge 37 is perpendicular to a longitudinal axis of symmetry of the guide bar 5. The force applied to the gripping element 39 thus affects the frangible bridge 37 so that the connection between the detachable element 31 and the core plate 25 is broken.

The gripping element 39 may also be provided with a passage 41. The passage 41 (FIG. 6) can be centrally arranged in the gripping element 39. An element may be introduced into passage 41 to apply a force to break the frangible bridge 37 and thereby remove of the detachable element 31 from the core plate 25.

This step may be performed automatically.

Figure 7:
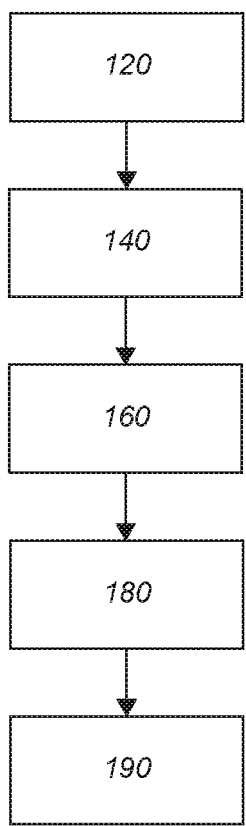
FIG. 7 illustrates a method for production of a guide bar.

At production of the guide bar according to the method (100), as shown in FIG. 7, the perforated core plate 25 with at least one detachable element 31 comprising a gripping element 39, wherein the core plate 25 and the detachable element 31 are attached to each other through at least one frangible bridge 37, is first cut (120) from a single piece of sheet metal. The core plate 25 is then sandwiched (140) between a pair of side plates 23*a*, 23*b* and joined (160) together, for example by welding, to form a guide bar 5. The guide bar 5 may then be subjected to hardening and tempering (180) processes to provide the guide bar 5 with suitable mechanical properties. The detachable element 31 may then be removed (190) from the guide bar 5 to provide a portion of a guide groove 27 along an edge of the guide bar 5. A saw chain may fit precisely and travel straight within the formed guide groove 27. According to a second aspect of the invention, there is provided a guide bar 5, wherein the guide bar 5 comprises a laminated structure of at least three layers: A first side plate 23a, a second side plate 23b, and a core plate 25 disposed between said first side plate 23a and said second side plate 23b, wherein the core plate 25 is provided with at least one detachable element 31. The detachable element 31 may be integrally formed with the core plate 25. If the detachable element 31 is removed from the core plate 25 a portion of a guide groove 27 is formed.

Figure 8:
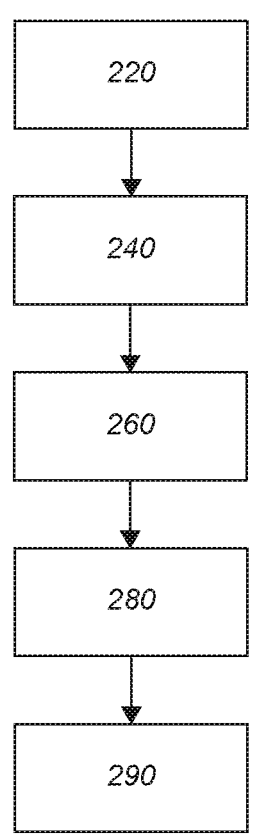
FIG. 8 illustrates an alternative method of production of a guide bar.

According to an alternative production method (200), shown in FIG. 8, a core plate 25 is arranged (220) between a pair of side plates 23a, 23b to form a sandwiched structure with a guide groove 27 between the side plates 23a, 23b. A spacer is arranged (240) within the guide groove 27 and the plates 25, 23a, 23b are joined (260) together, for example by welding to form a guide bar 5. The guide bar 5 may then subjected to hardening and tempering (280) processes to provide the guide bar with suitable mechanical properties. The spacer is then removed (290) from the guide groove 27. The spacer may be a plate with the same thickness as the core plate 25 preventing the side plates 23a, 23b from collapsing inwards in the guide groove 27 during joining, hardenings and heat treatments. The spacer, which may be a completely separate component, may be fitted within the guide groove and removed from the same manually or automatically.

The invention has mainly been described above with reference to a few embodiments. However, as is readily appreciated by a person skilled in the art, other embodiments than the ones disclosed above are equally possible within the scope of the invention, as defined by the appended patent claims.

In the claims, the word "comprising" does not exclude other elements or steps, and the indefinite article "a" or "an" does not exclude a plurality.

The invention claimed is:

1. A method for production of a chainsaw guide bar, the method comprising:
providing an elongated core plate extending along a plane of the guide bar, the core plate having a length in a longitudinal direction and a width perpendicular to the longitudinal direction in said plane of the guide bar, the core plate comprising a pair of opposite long side edges extending over an entirety of the length of the core plate from a rear end of the guide bar to a front end of the guide bar to form a base of a guide groove and at least one detachable element that extends entirely from the rear end to the front end along an entirety of at least one of the long side edges;
arranging a pair of side plates disposed one on each side of the core plate, thereby forming a sandwiched structure;
joining the core and side plates to form an elongated guide bar, wherein the at least one detachable element remains attached to the core plate,
wherein the at least one detachable element is formed integrally with the core plate,
wherein the at least one detachable element and a proximate one of the long side edges are separated by a gap between the core plate and the at least one detachable element, and
wherein the gap extends entirely from the rear end to the front end along at least one of the long side edges and is interrupted by at least one frangible bridge operably coupling the at least one detachable element to the core plate.

2. The method according to claim 1, further comprising hardening and tempering of the guide bar, while the at least one detachable element remains attached to the core plate.

3. The method according to claim 1, further comprising removal of the at least one detachable element to form at least a portion of the guide groove along an edge of the guide bar.

4. The method according to claim 1, wherein the length and width of the core plate are smaller than a corresponding length and width of the side plates.

5. The method according to claim 1, wherein providing the core plate further comprises providing the frangible bridge with a thickness of at least 0.5 mm, perpendicular to the plane of the guide bar.

6. The method according to claim 1, wherein providing the core plate further comprises providing the frangible bridge with a length of at least 1 mm.

7. The method according to claim 1, wherein providing the core plate comprises providing the core plate with a plurality of frangible bridges.

8. The method according to claim 7, wherein providing the core plate further comprises providing the at least one detachable element with at least one gripping element, integrally formed with the detachable element.

9. The method according to claim 8, wherein providing the core plate comprises providing the at least one detachable element with one gripping element of the at least one gripping element for each frangible bridge among the plurality of frangible bridges.

10. The method according to claim 8, wherein removal of the at least one detachable element from the core plate comprises gripping of the gripping elements for removal of the at least one detachable element from the core plate, and pulling along the plane of the guide bar in a direction transverse to the longitudinal direction.

11. The method of claim 10, wherein removal of the at least one detachable element from the core plate occurs after the core plate has been joined to the side plates.

12. The method according to claim 7, wherein the plurality of frangible bridges forms a perforation between the core plate and the at least one detachable element.

13. The method according to claim 1, wherein providing the core plate comprises arranging a gripping element at the frangible bridge so that a straight line passing through the gripping element and the frangible bridge, is perpendicular to a longitudinal axis of symmetry of the guide bar.

14. The method according to claim 1, wherein providing the core plate comprises providing the core plate with at least one cutout hole, said at least one cutout hole being covered by the side plates so that a closed space is formed within the guide bar.

15. A method for production of a chainsaw guide bar, the method comprising:
arranging a side plate on each side of a core plate, thereby forming a sandwiched structure with a guide groove between the side plates;
arranging a spacer within the guide groove;
joining the core and the side plates to form an elongated guide bar;
hardening and tempering of the guide bar; and
removing the spacer from the guide groove,
wherein the spacer is formed integrally with the core plate,
wherein the core plate comprises a pair of opposite long side edges that extend over an entirety of a length of the core plate from a rear end of the guide bar to a front end of the guide bar to form a base of the guide groove, wherein the spacer extends entirely from the rear end to the front end along an entirety of at least one of the long side edges, wherein the spacer and a proximate one of the long side edges are separated by a gap between the core plate and the spacer, and wherein the gap extends entirely from the rear end to the front end along at least one of the long side edges and is interrupted by at least one frangible bridge operably coupling the spacer to the core plate.

16. The method of claim 15, wherein removing the spacer from the guide groove comprises gripping a gripping element of the spacer and pulling along a plane of the guide bar in a direction transverse to the longitudinal direction.

17. A guide bar for a chainsaw, the guide bar comprising:
a laminated structure of at least three layers comprising a first side plate, a second side plate, and a core plate disposed between said first side plate and said second side plate;

wherein the core plate is provided with at least one detachable element, wherein the at least one detachable element is formed integrally with the core plate, and wherein the core plate comprises a pair of opposite long side edges that extend over an entirety of a length of the core plate from a rear end of the guide bar to a front end of the guide bar to form a base of a guide groove, wherein the at least one detachable element extends entirely from the rear end to the front end along an entirety of at least one of the long side edges, wherein the at least one detachable element and a proximate one of the long side edges are separated by a gap between the core plate and the at least one detachable element, and wherein the gap extends entirely from the rear end to the front end along at least one of the long side edges and is interrupted by at least one frangible bridge operably coupling the at least one detachable element to the core plate.

18. The guide bar according to claim 17, wherein a portion of the guide groove is configured to be formed by removing the at least one detachable element from the core plate.

19. The guide bar of claim 18, wherein removing the at least one detachable element from the core plate comprises gripping a gripping element of the at least one detachable element and pulling along a plane of the guide bar in a direction transverse to the longitudinal direction.

* * * * *